(No Model.) 3 Sheets—Sheet 3.
J. S. DETRICK.
FENDER AND BRAKE FOR STREET CARS.

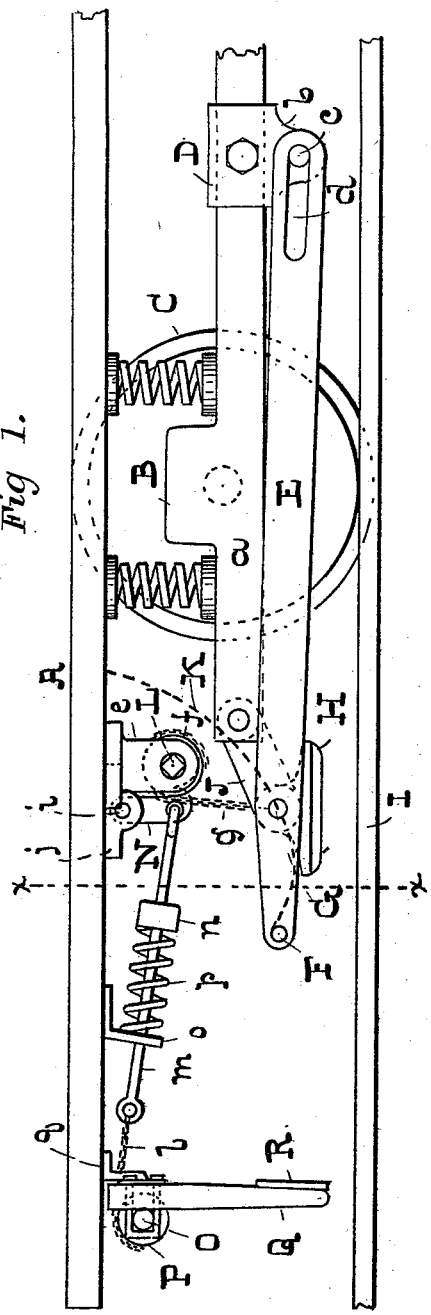

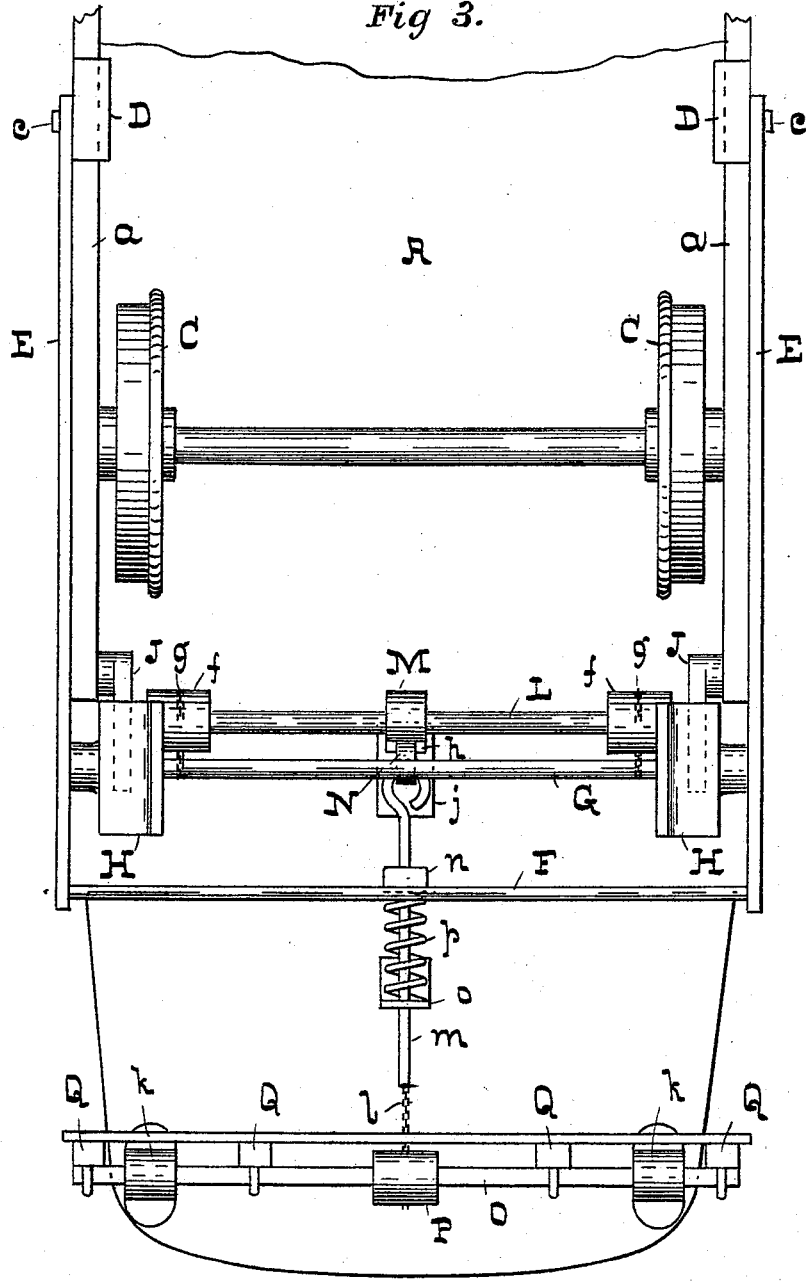

No. 528,766. Patented Nov. 6, 1894.

WITNESSES
Dan'l Fisher
George Hemsley

INVENTOR
Jacob S. Detrick,
by G. H. W. J. Howard,
Atty.

THE NORRIS PETERS CO., PHOTO-LITHO., WASHINGTON, D. C.

UNITED STATES PATENT OFFICE.

JACOB S. DETRICK, OF BALTIMORE, MARYLAND.

FENDER AND BRAKE FOR STREET-CARS.

SPECIFICATION forming part of Letters Patent No. 528,766, dated November 6, 1894.

Application filed October 11, 1893. Serial No. 487,813. (No model.)

*To all whom it may concern:*

Be it known that I, JACOB S. DETRICK, of Baltimore, Maryland, have invented certain Improvements in Combined Wheel Fenders and Brakes for Street-Cars, of which the following is a specification.

In the description of the said invention which follows, reference is made to the accompanying drawings forming a part hereof, and in which—

Figure 4:
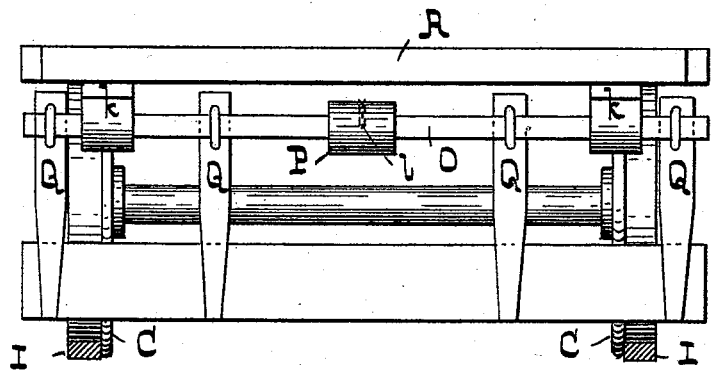
Figure 5:
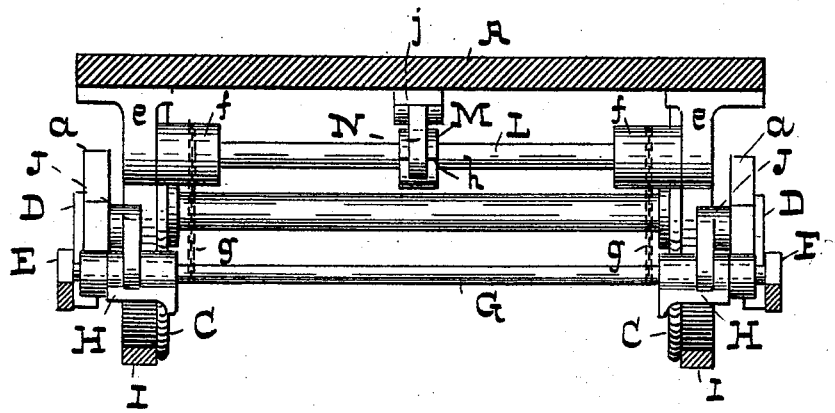

Figure 1, is a side view of a portion of a car provided with the improved wheel fender and brake which is represented as in its normal condition, or that in which it is retained until an accident is likely to occur. Fig. 2, is a similar view except that the invention is shown as in operation or use. Fig. 3, is an under side view of Fig. 1. Fig. 4, is an exterior front view of Fig. 1, and Fig. 5, a section of Fig. 1 taken on the dotted line $x$—$x$.

Referring to the drawings, A is the platform, and B the truck of a street car. The front wheels are denoted by C.

To each side frame $a$ of the truck B, is secured a block D having a lug $b$ with a projecting pin $c$.

E E are bars each having a slot $d$ to receive the pins $c$ of the blocks D. The forward ends of the bars E are united by a rod F and somewhat in the rear of this rod is another rod G.

H H are brake shoes on the rod G, situated directly over the track rails I. These brake shoes have slots which admit of the application to the rod, of the supporting links J which are hinged or pivoted to the side frames $a$ of the truck B. With this construction it will be seen that the connecting bars are susceptible of a forward and backward movement limited by the length of the slot $d$, and that in the backward movement the brake shoes are brought into contact with the track rails before the pins $c$ strike the forward ends of the slots, and while the links J are yet in an angular position. (See Fig. 2.)

The bar F which constitutes the front end of the fender proper, is preferably covered with some soft material, and to it is attached the front end of a flexible apron K of netting or canvas. The rear end of this apron is secured to the car platform or truck somewhere in front of the wheels C. The apron is represented in Figs. 1 and 2 by a dotted line.

L is a shaft hung in bearing boxes $e$ pendent from the platform A. Small winding drums $f$ are suitably fastened to the shaft L and connected by winding chains $g$ to the rod G.

M is a cylindrical block fastened to the shaft L preferably about the center thereof and notched out at one side to form a lip $h$.

N is a hook on the shaft $i$ supported by a hanger $j$ bolted to the under side of the platform A.

The relative positions of the hook N and the notched cylindrical block M is such that the hook may be made to engage with the lip $h$ when the chains $g$ are wound, and thereby prevent the unwinding of the said chains and the falling of the bars E and the shoes H.

O is a shaft sustained by hangers $k$ near the front end of the platform A. On this shaft is another winding drum P having a chain $l$ attached to a rod $m$ loosely connected to the hook N. The winding of this chain on its drum causes the hook N to be withdrawn from the lip $h$ and allows the bars E and the brake shoes H to fall to the positions shown in Fig. 2.

In order that some slight resistance is offered to this movement of the winding chain, the rod $m$ has a collar $n$ and between this collar and a bracket $o$ is confined, endwise, a spiral spring $p$ which is coiled about the rod $m$.

The shaft O has a series of light pendent arms Q which extend to near the surface of the ground, but are elevated sufficiently to avoid striking small objects such as stones, and they are all attached to a transverse board R.

Supposing the various parts of the invention to be in the relative positions shown in Fig. 1, any small object on the ground is passed over, but should a person fall on the track the arms Q and the board R upon striking the body are forced inward and the hook N being thus detached from the lip $h$ of the cylindrical block M, the bars E and the brake shoes H fall, and the latter then bear on the track rails I. The friction of the brake shoes on the track rails serves to rapidly stop the car, or so to reduce its speed that should the person come in contact with the fender he will not be materially injured. The apron under any circumstances prevents the person from passing under the wheels of the car.

The stopping of the car while rapidly effected, is not sudden enough to cause injury to the car or its occupants. After the removal of the fallen person, the various parts of the mechanism are placed in their original positions by winding the shaft L by means of a crank not shown, which crank is applied to the end of the shaft, which is made square for the purpose. (See Figs. 1 and 2.)

It is believed that the automatic stoppage of the car by means independent of the ordinary brake mechanism, is as important as the setting of the fender, as in many cases of accident, the motor-man or gripman has scarcely time after the falling of the person, to bring the ordinary brakes into action.

In order to prevent the arms Q from moving forward beyond a vertical line, the under side of the platform is provided with a stop $q$ which strikes one of the said arms at a point above the shaft. See Figs. 1 and 2.

I claim as my invention—

1. In combination with a flexible apron secured to the under side of the car body and in front of the wheels thereof constructed and arranged to have a vertical and a forward and backward movement, and mechanism to support the lower end of the said apron above the track rails and in a forward position, releasing devices situated in front of the supporting mechanism, constructed to lift when struck by an object on the track and thereby pass over the same, and at the same time drop the apron and allow it to fall back, substantially as specified.

2. In combination with a flexible apron secured to the under side of a car body and in front of the wheels thereof, and mechanism to support the lower end of the said apron above the track rails, brake shoes on the supporting mechanism, and actuating devices to release the lower end of the apron, constructed to lift and thereby pass over the object which is struck, substantially as specified.

3. In combination with a supported wheel fender and elevated brake shoes, swinging releasing mechanism adapted to lift and thereby pass over an obstructing body and at the same time drop the fender and bring the brake shoes into contact with the track rails, substantially as specified.

4. In combination with some fixed part of a car truck pivoted sliding bars united by a rod at their front ends and carrying brake shoes an apron connected at one end to the said rod, and at the other to the car body, a winding drum and chain whereby the said bars, the brake shoes and the apron may be lifted, a suitable hook to hold the wound chain, another winding drum situated forward of the said mechanism connected by a chain to the said hook, and pendent bars or devices united to the said winding drum or some connection thereof, whereby, upon the pendent arms being struck the first named drum is allowed to unwind its chain and thereby drop the bars, brake shoes and apron, substantially as specified.

JACOB S. DETRICK.

Witnesses:
GEO. E. TAYLOR,
WM. T. HOWARD.